April 16, 1940.  L. E. LA BRIE  2,196,995
HYDRAULIC BRAKE CYLINDER
Filed Sept. 9, 1935   2 Sheets-Sheet 1
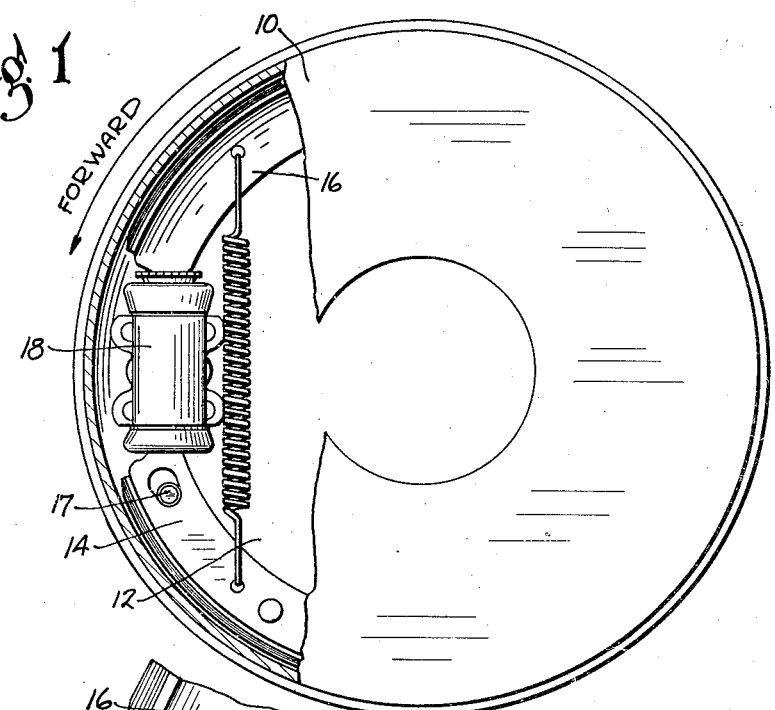
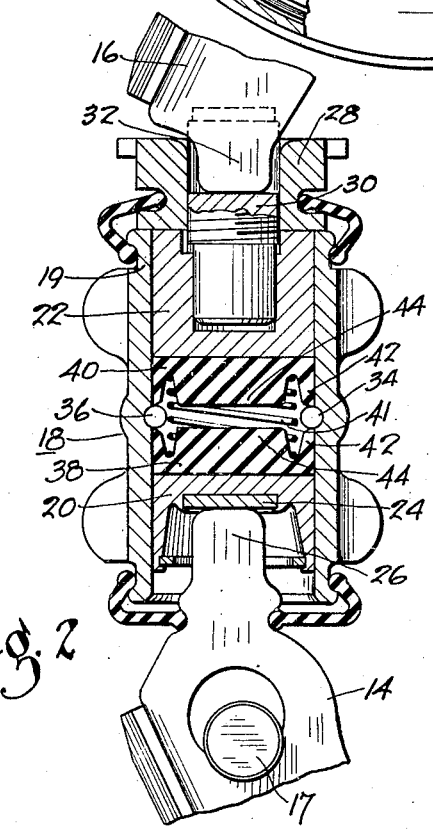
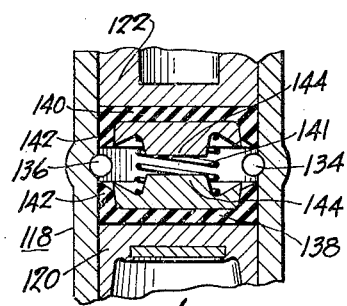
INVENTOR.
LUDGER E. LABRIE
BY Jerome R. Cox
ATTORNEY.

April 16, 1940. L. E. LA BRIE 2,196,995
HYDRAULIC BRAKE CYLINDER
Filed Sept. 9, 1935 2 Sheets-Sheet 2
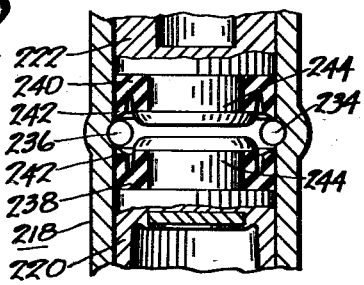
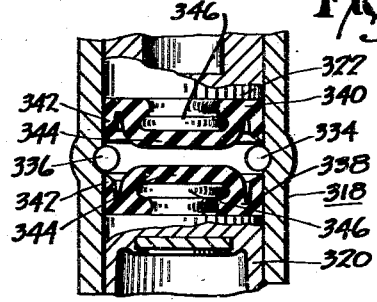
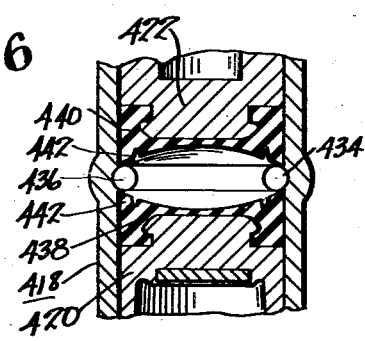
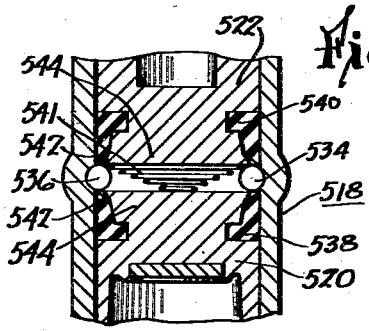
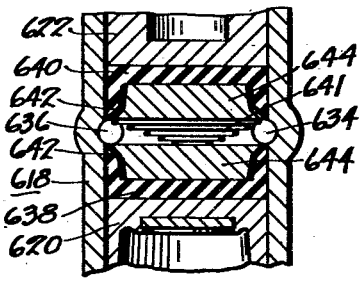
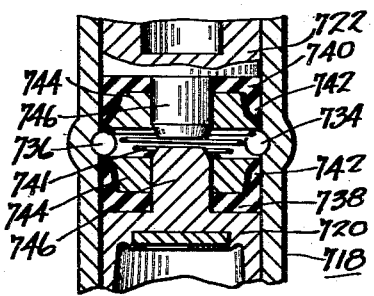
INVENTOR.
LUDGER E. LaBRIE
BY Jerome R. Cox
ATTORNEY Patented Apr. 16, 1940

2,196,995

UNITED STATES PATENT OFFICE 2,196,995

HYDRAULIC BRAKE CYLINDER

Ludger E. La Brie, South Bend, Ind., assignor to Bendix Products Corporation, South Bend, Ind., a corporation of Indiana Application September 9, 1935, Serial No. 39,738

4 Claims. (Cl. 60—54.6)

This invention relates to fluid power cylinders and is especially applicable to power cylinders adapted to be used in operating hydraulic brakes.

One of the objects of the invention is the elimination of unnecessary and disadvantageous space between the pistons of a power actuator.

A further object of the invention is the provision of means for aiding in bleeding of hydraulic brake systems.

A further object of the invention is the elimination of space which would otherwise trap unwanted air in hydraulic brake systems.

Further objects and features of the invention will be apparent after a reading of the subjoined specification and claims and after a consideration of the accompanying drawings, in which:

Figure 1 is a view partially in side elevation and partially in section showing a brake constructed according to my invention;

Figure 2 is a fragmentary sectional view of a portion of the brake shown in Figure 1;

Figure 3 is a fragmentary sectional view of a modified form of wheel cylinder;

Figure 4 is a view similar to Figure 3 showing another modified form of wheel cylinder;

Figure 5 is a view similar to Figures 3 and 4 showing another modified form of wheel cylinder; and Figures 6, 7, 8 and 9 are views all similar to Figures 3, 4 and 5 showing other modified forms of wheel cylinders.

Referring in detail to the drawings, it may be seen that I have shown a brake comprising a drum 10, a backing plate 12, shoes 14 and 16 and a hydraulic wheel cylinder 18 interposed between the shoes 14 and 16 for spreading them into contact with the drum 10 when it is desired to stop or retard the rotation of said drum. It is to be especially noted that the wheel cylinder 18 is disposed with its longitudinal axis substantially vertical.

The cylinder 18, as is shown more clearly in Figure 2, is provided with pistons 20 and 22 each arranged to act upon one of the shoes 14 and 16. It may be noted that the piston 20 is provided with a wear plate 24 which contacts with an extension 26 of the shoe 14 and that the piston 22 is arranged to act against a cap 28 which has threaded into it a plug 30 on which the extension 32 of the shoe 16 bears. It may be further noted that the cap 28 is adapted to anchor upon the end of the cylinder case 19 and thus absorb the torque of braking when the brake is actuated while the drum is rotating in a counterclockwise direction. It may be further noted that the anchoring position as well as the return position of the shoe 16 may be adjusted by rotation of the cap 28. Opposite to the cylinder 18 is another cylinder similar thereto also having its longitudinal axis arranged vertical. By means of a cap similar to the cap 28 the anchoring and return positions of the shoe 14 may also be adjusted. In braking when the drum is rotating in the clockwise direction the shoes anchor on the anchor 17 and a corresponding anchor positioned adjacent the hidden end of the shoe 16.

Each of the cylinders is provided with an inlet opening 34 and a bleed opening 36 and each of the pistons 20 and 22 is provided with a rubber packing such as 38 and 40. Interposed between the packings 38 and 40 is a spring 41 for maintaining the packings in contact with the pistons.

It may be seen that the packings 38 and 40 are each formed with an annular lip 42 extending inward of the cylinder and contacting with the walls of the cylinder and are each also provided with a circular central portion 44 so as to substantially fill the space between the two cups. Thus the space above the bleed opening 36 in which air might be trapped is substantially eliminated.

In Figure 3 the cylinder 118 is formed with inlet opening 134 and bleed opening 136 and is provided with pistons 120 and 122 which are provided with cup shaped packings 138 and 140 respectively. These cup shaped packings are also formed with annular lips 142 and are provided with central metallic blocks 144 for eliminating the greater part of the space between the cups. The spring 141 is provided for obvious reasons.

In the form shown in Figure 4 the cylinder 218 is formed with inlet opening 234 and bleed opening 236 and is provided with pistons 220 and 222 each provided with an annular cup washer or packing such as 238 and 240. Each of these packings has an annular lip 242. The pistons 220 and 222 each have a central projection 244 which extends through its associated cup and which together substantially fill the space between the cups.

In Figure 5 the cylinder 318 is formed with inlet opening 334 and bleed opening 366 and is provided with pistons 320 and 322, each of which is provided with rubber washers such as 338 and 340 respectively. These washers are provided with annular lips 342 and are formed with a central inwardly extending portion 344 molded so as to fit around a knob-like extension 346 of the associated piston.

In the arrangement shown in Figure 6 there is a cylinder 418 provided with pistons 420 and 422 and formed with an inlet opening 434 and a bleed opening 436. The pistons 420 and 422 are provided with packings 438 and 440 respectively, each of these packings having a lip 442. The packings are secured to the ends of the pistons by being molded to fit over knob-like extensions 446 formed on the ends of said pistons.

In the arrangement shown in Figure 7 the cylinder 518 is provided with pistons 520 and 522 and is formed with an inlet opening 534 and a bleed opening 536. The pistons 520 and 522 are provided with annular packings 538 and 540 respectively. The packings 538 and 540 are formed with annular lips 542 and the pistons 520 and 522 are provided with central extensions forming blocks 544 which substantially fill the space between the packings. A spring 541 is interposed between the blocks 544.

In the arrangement shown in Figure 8 the cylinder 618 is provided with pistons 620 and 622 and is formed with an inlet opening 634 and a bleed opening 636. The pistons 620 and 622 are provided with packing cups 638 and 640 respectively. Each of the cups 638 and 640 is formed with an annular rim or lip 642 and there are provided a pair of metallic blocks 644 interposed between two packing cups for substantially filling the space therebetween. Interposed between the two blocks 644 is a spring 641.

The arrangement shown in Figure 9 corresponds substantially to that shown in Figure 8. The cylinder 718 is provided with pistons 720 and 722 and is formed with an inlet opening 734 and a bleed opening 736. Each of the pistons is provided with an annular seal such as 738 and 740 respectively. Each of these annular packings is formed with an annular lip 742 and interposed between the packings 738 and 740 are a pair of blocks 744 and a spring 741. Extending through the block 744 and forming a guide for the spring 741 are pin-like projections 746 formed on the pistons 720 and 722.

It is to be understood that the above-described embodiments of my invention are for the purpose of illustration only and various changes may be made therein without departing from the spirit and scope of the invention.

I claim:

1. In a hydraulic braking system in which vertical actuating means is used, an actuating cylinder having its axis positioned substantially vertically being formed with an inlet opening and a bleed opening, and provided with a pair of pistons each formed with an extension gradually increasing in diameter toward the central portion of the cylinder, and a sealing packing member for each of said pistons, said packings each being formed with an annular lip contacting with the sides of the cylinder and having a space between the edges of said lip through which the piston extensions extend and the extension of the piston forming a central member substantially filling said space, said central member extending toward the center of said actuating cylinder at least as far as the plane of the annular lip.

2. In a hydraulic braking system in which vertical actuating means is used, an actuating cylinder having its axis positioned substantially vertically being formed with an inlet opening and a bleed opening, and provided with a pair of pistons each formed with an extension gradually increasing in diameter toward the central portion of the cylinder, and an annular sealing packing member for each of said pistons, said packings each being formed with an annular lip contacting with the sides of the cylinder and having a space formed between the edges of said lip through which the piston extensions extend and each being provided with a central member substantially filling said space, said central member extending toward the center of said actuating cylinder at least as far as the plane of the annular lip.

3. In a hydraulic braking system in which a vertical actuating means is used, an actuating cylinder having its axis positioned substantially vertically, being formed with an inlet opening and a bleed opening, a pair of piston means for said cylinder, one said piston means being positioned above the other and each said piston means comprising a packing formed with an annular lip contacting with the sides of the cylinder and a central metallic portion substantially filling the space within said annular lip gradually increasing in diameter toward the tip of said lip.

4. In a hydraulic braking system in which a vertical actuating means is used, an actuating cylinder having its axis positioned substantially vertically, being formed with an inlet opening and a bleed opening, a pair of piston means for said cylinder, one said piston means being positioned above the other and each said piston means comprising a cup packing formed with an annular lip contacting with the sides of the cylinder and a central metallic portion in front of said cup substantially filling the space within said cup gradually increasing in diameter toward the tip of said lip.

LUDGER E. LA BRIE.